United States Patent [19]

Isobe et al.

[11] Patent Number: 4,855,657
[45] Date of Patent: Aug. 8, 1989

[54] POSITIONING SYSTEM

[75] Inventors: Shinichi Isobe, Hino; Yoshimasa Kagawa, Hachioji, both of Japan

[73] Assignee: Fanuc Ltd., Minamitsuru, Japan

[21] Appl. No.: 145,755

[22] PCT Filed: May 16, 1987

[86] PCT No.: PCT/JP87/00305

§ 371 Date: Dec. 22, 1987

§ 102(e) Date: Dec. 22, 1987

[87] PCT Pub. No.: WO87/07404

PCT Pub. Date: Dec. 3, 1987

[30] Foreign Application Priority Data

May 29, 1986 [JP] Japan ................... 61-124235

[51] Int. Cl.⁴ ............................................. G05B 19/29
[52] U.S. Cl. .................................... 318/602; 318/603; 364/474.28
[58] Field of Search ................. 318/602, 603; 364/474

[56] References Cited

U.S. PATENT DOCUMENTS 4,725,959 2/1988 Nagata ................................ 364/474
4,751,442 6/1988 Kurakake ........................... 318/567

Primary Examiner—William M. Shoop, Jr.
Assistant Examiner—Saul M. Bergmann
Attorney, Agent, or Firm—Staas & Halsey

[57] ABSTRACT

A positioning system rotates a servomotor (4) in response to a command value to move a movable unit and compares a feedback signal from a position detector, such as a servomotor or the like, with the command value to output a servo command signal. Pulses from an encoder (5) are counted to generate a positional information signal (6) directly indicative of an angular position of the servomotor (4), and the positional information signal is fed back to a command processor (2) to effect a positioning operation.

7 Claims, 3 Drawing Sheets

POSITIONING SYSTEM

BACKGROUND OF THE INVENTION

The present invention relates to a positioning system for use in a numerical control apparatus, a robot control apparatus, or the like. More particularly, the present invention is directed to a positioning system which uses a feedback signal as a positional information signal to effect a highly accurate and high-speed positioning operation.

Conventional positioning systems have employed a pulse train having a certain weight, e.g., a pulse corresponding to, for example, 1 μm, or any other predetermined time period, as a feedback signal. One example of such an arrangement is shown in FIG. 3 of the accompanying drawings. Denoted in FIG. 3 at 1 is a pulse distributor for generating distribution pulses in response to a tape input or the like, 2 a command processor for comparing pulses from the pulse distributor 1 and feedback pulses and issuing a servo command signal, 3 a servoamplifier responsive to the servo command signal from the command processor 2 for driving a servomotor 4 to actuate a movable unit (not shown. The servomotor 4 includes an encoder 5 as a position detector coupled to the shaft of the servomotor 4 for generating feedback pulses 8 as a feedback signal, and an up/down counter 7 for counting the feedback pulses 8. The count is read by the command processor 2.

For a numerical control apparatus and the like, there are demands for higher positioning accuracy and higher pulse distribution rate. The conventional systems have difficulty in meeting such demands.

More specifically, the pulse distribution rate of conventional systems is on the order of 1 MHz because of the characteristics of the transmission path for feedback pulses. The rate of the resolution "0.1 micron/pulse" at the pulse distribution rate is given by:

$$0.1 \times 10^{-6} \times 10^6 \times 60 = 6$$
$$(m/p) \quad (p/s) \quad (m/min)$$

$0.1 \times 10^{-6}$ indicates a numerical value representing "0.1 micron/pulse" in terms of meters (m), $10^6$ indicates the transmission rate for feedback pulses (1 MHz expressed by pps), and 60 indicates a numerical value for conversion to a value per minute. From the above equation, the speed of movement of the movable unit is 6 m/minute, indicating that a sufficiently high speed cannot be obtained.

SUMMARY OF THE INVENTION

It is an object of the present invention to provide a positioning system which will solve the aforesaid problems and is capable of a high-speed positioning operation even at highly accurate resolution.

To solve the above problems, there is provided, in accordance with the present invention, a positioning system comprising a servomotor rotatable in response to a command value for moving a movable unit, command means for comparing a feedback signal from a position detector mounted on the servomotor or the movable unit with the command value and issuing a servo command value, and positional information generating means for generating a positional information signal indicative of positional information of the servomotor or the movable unit. The arrangement is such that the positional information signal from the positional information generating means is fed back to the command means for providing a positioning operation.

Since the feedback signal is a positional information signal for the servomotor or the movable unit, this signal is read at given periods by a command processor which calculates the distance by which the movable unit is moved from a preceding positional information signal.

For example, assuming that the resolution is 0.1 micron/pulse and the maximum range of movement of the movable unit is 100 m, the range may be expressed in binary notation as follows:

$$100 \div (0.1 \times 10^{-6}) = 10^9 \approx 2^{30}$$

and hence can be represented in 30 bits. If the sampling period of the command processor is 1 ms, then the pulse transmission rate may be 30 bits per 1 ms:

$$30 \text{ (bits)} \div 1 \text{ (ms)} = 30 \times 10^3 \text{ (bits/s)}.$$

Therefore, the feedback signal can be transmitted at a sufficiently low transmission rate.

DESCRIPTION OF THE PREFERRED EMBODIMENT

An embodiment of the present invention will hereinafter be described in specific detail with reference to the drawings.

Figure 1:
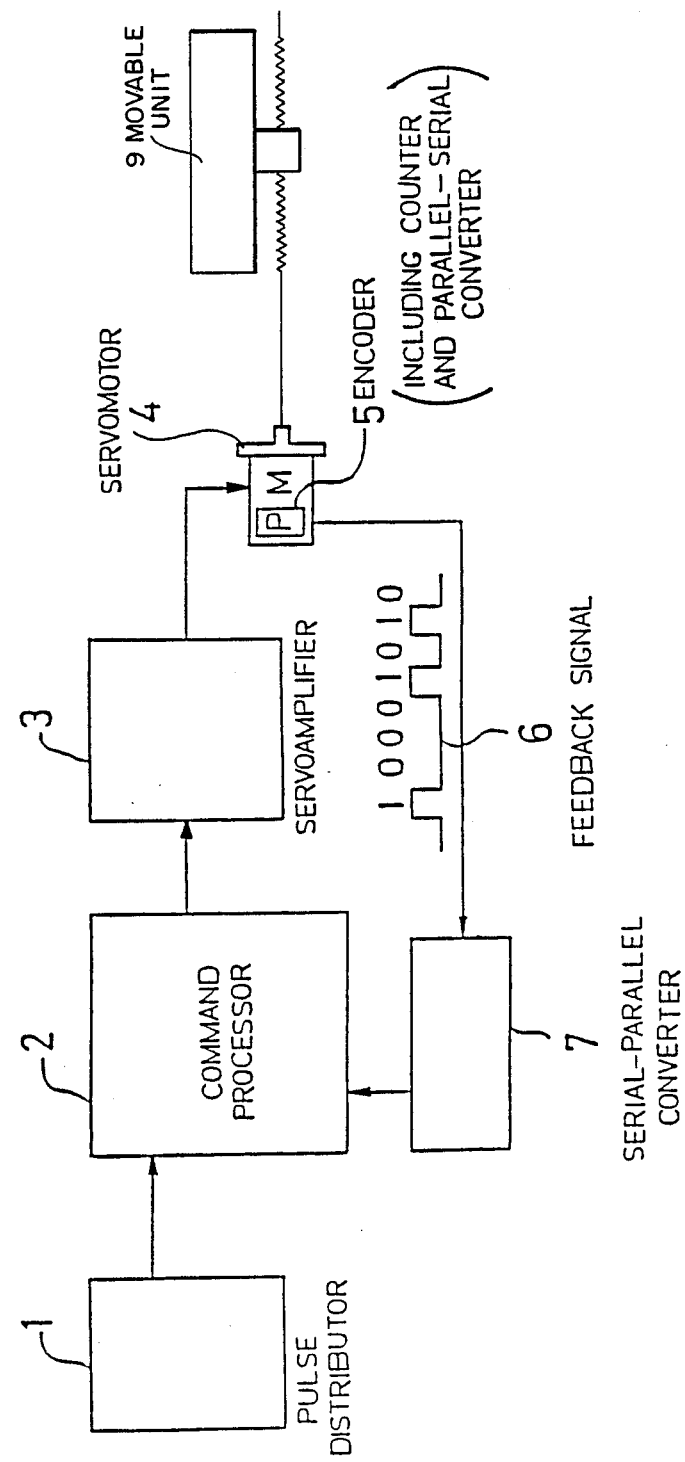
FIG. 1 is a block diagram of a positioning system according to an embodiment of the present invention.

FIG. 1 is a diagram of a positioning system according to an embodiment of the present invention. Designated in FIG. 1 is a pulse distributor 1 for generating distribution pulses in response to a tape input or the like, a command processor 2 for comparing pulses from the pulse distributor 1 and feedback pulses and issuing a servo command signal, and a servo amplifier 3 responsive to the servo command signal from the command processor 2 for driving a servomotor 4 to actuate a movable unit 9. The servomotor 4 includes an encoder 5 as a position detector coupled to the shaft of the servomotor 4. The encoder 5 includes a counter for counting the amount of movement, and a parallel-serial converter for converting the count of the counter to a serial signal. The servomotor 4 generates a feedback signal 6 indicative of the present position of the movable unit. The feedback signal 6 is shown here as an 8-bit signal for convenience. A serial-parallel converter 7 is responsive to the serial feedback signal 6 for converting the serial feedback signal 6 to a parallel signal. The command processor 2 reads the parallel signal, i.e., the present position of the movable unit, calculates the difference between the present position thus read and the present position in the preceding cycle to detect the amount of movement of the movable unit, compares the detected amount of movement and a command value from the pulse generator 1 to determine a servo command value, and then outputs the servo command value.

Figure 2:
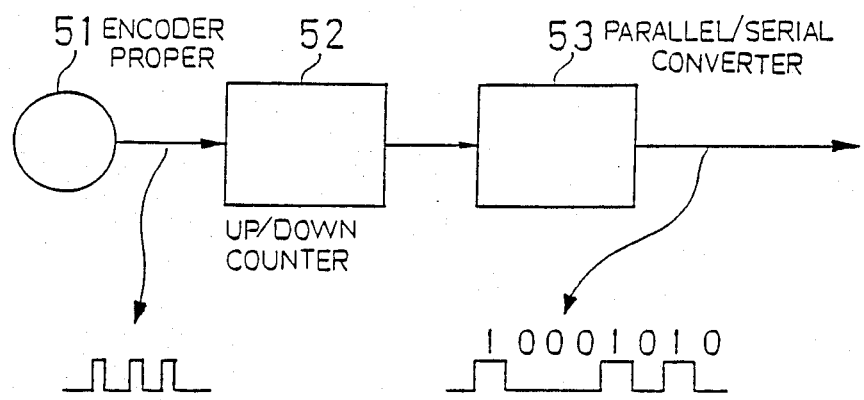
FIG. 2 is a block diagram of the encoder in FIG. 1.
Figure 3:
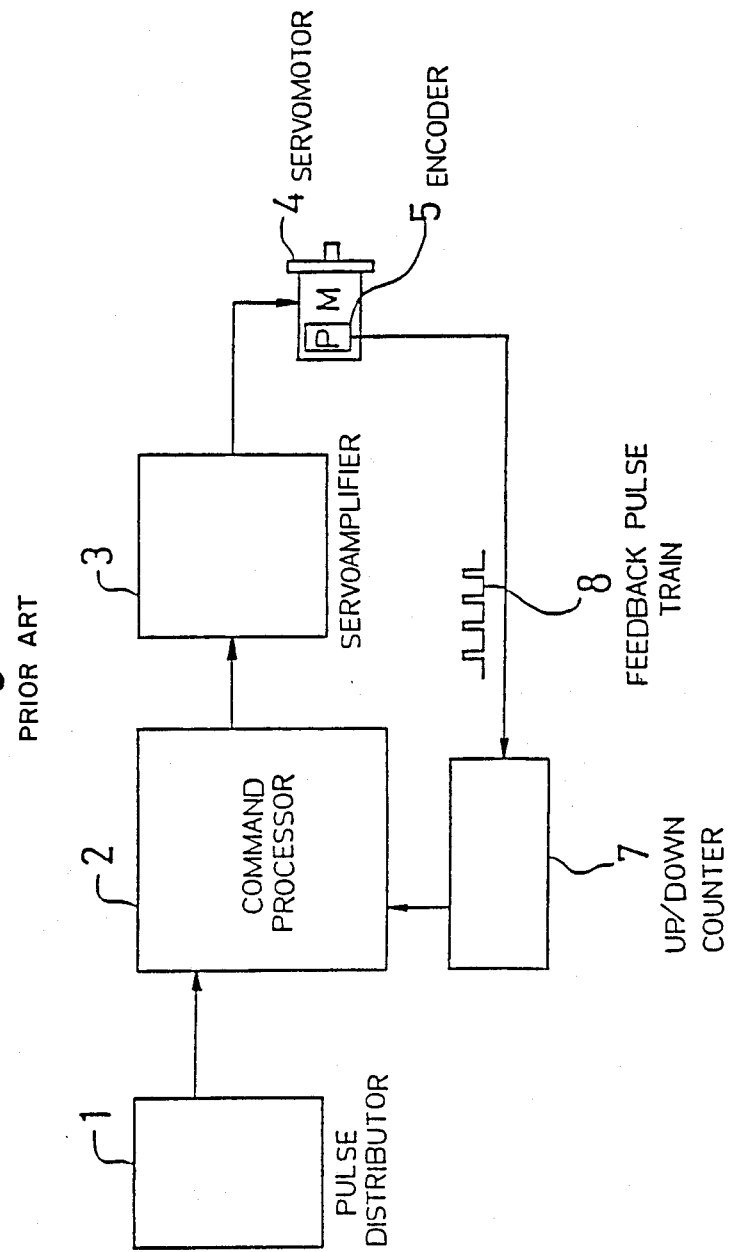
FIG. 3 is a block diagram of a conventional positioning system.

The arrangement of the encoder 5 will be described below. FIG. 2 is a block diagram of the encoder 5.

Denoted in FIG. 2 is an encoder proper 51 for issuing pulses proportional to the amount of rotation of the servomotor, an up/down counter 52 for counting the pulses from the encoder proper 51 and issuing a value indicative of the count, and a parallel-serial converter 53 for reading the output from the up/down counter 52, converting the output to a serial signal and issuing the serial signal, (shown as an 8-bit serial signal for convenience).

Since the feedback signal is used as a present position signal in the present embodiment, the transmission rate for the feedback signal may be low compared with the pulse feedback signal. A wide choice of filters is available for preventing noise in the transmission path, resulting in increased reliability of the transmission path.

While the encoder 5 coupled to the servomotor 4 is used as a position detector in the above embodiment, the encoder 5 may be coupled to a ball screw or the like of the movable unit separately from the servomotor 4. Instead of the encoder 5, a resolver, an electromagnetic linear scale, an optical linear scale, or the like may be employed as a position detector.

The present position of the movable unit is used as a positional information signal in the above embodiment. However, the amount by which the movable unit is moved during a certain period of time may be detected by the encoder 5 and may be used as a positional information signal.

With the present invention, as described above, the positioning feedback signal is used as a positional information signal representing positional information. Therefore, a high speed of movement is made possible at high resolution even if the transmission rate along the feedback transmission path is low. Moreover, the reliability of the transmission path for the feedback signal is increased.

The many features and advantages of the invention are apparent from the detailed specification and thus, it is intended by the appended claims to cover all such features and advantages that fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

We claim:

1. A positioning system, including a movable unit, comprising:
   a servomotor, operatively connected to receive a command value and coupled to the movable unit, rotatable in response to the compound value for moving the movable unit;
   a positioning detector mounted on said servomotor and outputting a feedback signal;
   command means, coupled to said position detector and the movable unit, for comparing a feedback signal from said position detector and the movable unit with the command value and outputting a servo command value; and
   positional information generating means, coupled to said servomotor and the movable unit, for generating a positional information signal indicative of positional information of one of said servomotor and the movable unit, the arrangement being such that the positional information signal from said positional information generating means is fed back to said command means for performing a positioning operation.

2. A positioning system according to claim 1, wherein said positional information signal represents a present position of one of the movable unit and said servomotor.

3. A positioning system according to claim 1, wherein said positional information signal represents the amount by which one of the movable unit and said servomotor is moved in a given period of time.

4. A positioning system according to claim 1, wherein said positional information signal is fed back as a serial signal.

5. A positioning system according to claim 1, further comprising an encoder, mounted on said servometer, for outputting a signal, said positional information signal being obtained by counting the output signals from said encoder.

6. A positioning system, comprising:
   a pulse distributor;
   a command processor coupled to said pulse distributor;
   a servo amplifier coupled to said command processor;
   a servomotor coupled to said servo amplifier and outputting a feedback signal;
   a serial-parallel converter, coupled between said command processor and said servomotor, for receiving the feedback signal and outputting the converted feedback signal to said command processor for performing a positioning operation.

7. A positioning system according to claim 6, wherein said servomotor has coupled thereto:
   an encoder;
   an up/down counter connected to said encoder for receiving and counting signals from said encoder; and
   a parallel/serial converter, coupled to said up/down counter, for receiving the counted signals and outputting a signal to said serial/parallel converter.

* * * * *

UNITED STATES PATENT AND TRADEMARK OFFICE
CERTIFICATE OF CORRECTION

PATENT NO. : 4,855,657

DATED : AUGUST 8, 1989

INVENTOR(S) : SHINICHI ISOBE ET AL.

It is certified that error appears in the above-identified patent and that said Letters Patent is hereby corrected as shown below:

Col. 3, line 53, "compound" should be --command--.

Col. 4, line 1, "positioning" should be --position--;

line 29, "servometer," should be --servomotor,--.

Signed and Sealed this

Twenty-ninth Day of May, 1990

Attest:

HARRY F. MANBECK, JR.

*Attesting Officer*     *Commissioner of Patents and Trademarks*